(12) United States Patent
Hinckley et al.

(10) Patent No.: US 7,970,870 B2
(45) Date of Patent: Jun. 28, 2011

(54) EXTENDING DIGITAL ARTIFACTS THROUGH AN INTERACTIVE SURFACE

(75) Inventors: Kenneth P. Hinckley, Redmond, WA (US); Andrew D. Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 961 days.

(21) Appl. No.: 11/166,364

(22) Filed: Jun. 24, 2005

(65) Prior Publication Data

US 2006/0294247 A1    Dec. 28, 2006

(51) Int. Cl.
*G06F 15/177* (2006.01)
*G06F 3/00* (2006.01)
*G06F 3/01* (2006.01)
*G06F 3/041* (2006.01)
*G09G 5/00* (2006.01)

(52) U.S. Cl. ......... 709/220; 715/702; 715/744; 345/1.1; 345/2.1; 345/2.2; 345/2.3; 345/173

(58) Field of Classification Search ........ 345/1, 2.1–2.3; 709/220; 715/702, 744–748
See application file for complete search history.

(56) References Cited

U.S. PATENT DOCUMENTS

| | | | | |
|---|---|---|---|---|
| 6,572,015 | B1 * | 6/2003 | Norton ........................ | 235/382 |
| 6,710,754 | B2 * | 3/2004 | Oliver et al. ................... | 345/2.1 |
| 7,397,464 | B1 * | 7/2008 | Robbins et al. ............... | 345/173 |
| 2003/0147386 | A1 * | 8/2003 | Zhang et al. .................. | 370/390 |
| 2005/0093868 | A1 |  5/2005 | Hinckley | |
| 2005/0147218 | A1 * | 7/2005 | Novack et al. ............. | 379/88.18 |

OTHER PUBLICATIONS

Shahram Izadi, Dynamo: A public interactive surface supporting the cooperative sharing and exchange of media, 2003, The Mixed Reality Lab, University of Nottingham, Nottingham, UK NG8 1BB, vol. 5, Issue 2, pp. 159-168.*
James Patten, Sensetable: A Wirerless Object Tracking Platform for Tangible User Interfaces, Mar. 31-Apr. 4, 2001, Tangible Media Group, MIT Media Lab, Cambridge, MA 02139, vol. 3, Issue 1, pp. 253-260.*
Ayatsuka Y., Matsushita, N., Reikmoto, J. "HyperPalette: a Hybrid Computing Environment for Small Computing Devices." CHI 2000 Extended Abstracts (2000) pp. 133-134.
Hinckley, K. "Synchronous Gestures for Multiple Users and Computers." UIST'03 Symposium on Persons Interface Software & Technology (2003) 10 pages.
Hinckley, K., Ramos, G. "Pen Gestures that Span Multiple Displays" \\kenhw2k\research\papers\03\Gonzo\Stitching.doc (2003).

* cited by examiner

*Primary Examiner* — Phuoc Nguyen
*Assistant Examiner* — Clarence John
(74) *Attorney, Agent, or Firm* — Lee & Hayes, PLLC

(57) ABSTRACT

A unique system and method that facilitates extending input/output capabilities for resource deficient mobile devices and interactions between multiple heterogeneous devices is provided. The system and method involve an interactive surface to which the desired mobile devices can be connected. The interactive surface can provide an enhanced display space and customization controls for mobile devices that lack adequate displays and input capabilities. In addition, the interactive surface can be employed to permit communication and interaction between multiple mobile devices that otherwise are unable to interact with each other. When connected to the interactive surface, the mobile devices can share information, view information from their respective devices, and store information to the interactive surface. Furthermore, the interactive surface can resume activity states of mobile devices that were previously communicating upon re-connection to the surface.

20 Claims, 14 Drawing Sheets

EXTENDING DIGITAL ARTIFACTS THROUGH AN INTERACTIVE SURFACE

BACKGROUND

In recent years, portable computing and communication devices have inundated the market place. Competition has become fierce among manufacturers as they compete for the attention of consumers as well as their dollars. Thus, it is not uncommon for the average consumer to own a variety of portable devices such as a cell phone and a personal digital assistant (PDA) made from the same or different manufacturers or brands. Traditionally, different computing devices are not made to communicate with each other—especially if manufactured by or sold under different brands. For example, a Brand Q PDA typically cannot "talk" to a Brand Z PDA. Similarly, Brand Q PDA cannot interact with a Brand Z smartphone. For most users, this can cause many inconveniences and result in large amounts of wasted time because information must be entered separately into each device.

Associating peripheral input/output devices such as wireless keyboards and printers with a particular portable device can involve complex and cumbersome pairing procedures as well. For example, Bluetooth technology provides one conventional technique for pairing a device with a peripheral input/output tool. Unfortunately, Bluetooth only allows for fixed pairings. When a user of the tool is changed, the pairing process must be re-done. For instance, imagine that TOM's Bluetooth-enabled keyboard is paired with his laptop computer. TOM lends MARY his keyboard for her use with her tablet PC. When MARY is finished with the keyboard, she returns it to TOM. In this brief scenario, the Bluetooth-enabled tool requires the pairing process to be performed 3 separate times: twice by TOM and once by MARY.

In addition to the lack or inability of communication between different devices, technology, in general, as well as consumers have converged on the desire and/or need for smaller and smaller devices. Unfortunately, the smaller the device, the smaller the display area or user interface. Consequently, the amount of information which can be viewed at once or readily viewed at all may be substantially reduced or non-existent. For instance, personalizing the device or mere general use of the device can be time-consuming and frustrating for the user and result in an overall poor user experience.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a system(s) and/or methodology that facilitate operation of at least one mobile device and/or interaction between multiple mobile devices via an interactive surface. In particular, one or more mobile devices can connect to the interactive surface. Once connected, the one or more mobile devices can make use of the expanded display space of the interactive surface, thus making it much easier for the user to operate, customize, or manipulate data on the mobile device. Although such operations are particularly well suited to a horizontal or slightly angled interactive surface, which allows placing and letting go of multiple devices on the surface, similar interactions could be supported on a vertical or otherwise oriented surface by touching device(s) to the surface and then holding them there or putting them down elsewhere.

According to a first approach, for example, a mobile device can establish a wireless connection with the interactive surface. The interactive surface comprises a display space that is substantially larger than the display of the mobile device. Thus, when connected thereto, the display of the mobile device can be visualized on an expanded scale via the interactive surface. A variety of operations that may otherwise be performed directly on the mobile device with at least some difficulty can now be performed with greater ease via the interactive surface. Moreover, the interactive surface component acts as a portal to the mobile device display and/or data and hence, the user maintains control of the mobile device and its contents. To further enhance the user's overall experience, the interactive surface can be touch-sensitive and/or include a touch-sensitive pad and/or one or more other input mechanisms (e.g., keyboard, mouse, stylus, etc.) to facilitate navigation of data displayed on the interactive surface as well as on the mobile device.

Connection with the interactive surface can be accomplished in one or more different manners. For instance, the mobile device can be placed on the surface. Using a visual pattern located on the mobile device, the surface can read the pattern and identify the type and/or name of the device and call up the appropriate protocol(s) in order to open or create the proper channels to communicate and interact with the device. Alternatively, the visual pattern can be read from the mobile device when the mobile device is located within a physical proximity of the interactive surface. In either case, the connection can be established automatically or at the discretion of the user by way of employing one or more controls or buttons on the interactive surface. For example, when the presence of a mobile device is detected, a dialogue box may appear and ask the user whether a connection is desired—to which the user must respond before the connection is established. Disconnection can be accomplished in a similar manner. That is, the device may be removed from the surface or explicit controls or commands may be required to disconnect the mobile device from the surface.

Non-visual patterns or codes associated with the device can be employed as well to identify when the device is on or near the surface. Examples of such non-visual patterns or codes include RFID, short range wireless radio, capacitive coupling between device and the interactive surface, and an optical connection (e.g., blinking IR LED on bottom of mobile device).

According to a second approach, multiple mobile devices can communicate and/or interact with each other via the interactive surface. Initially, each device can establish a connection with the interactive surface. Once connected to the surface, the devices can share data and/or otherwise communicate with one another through the interactive surface. This can be particularly advantageous for sharing information among different types of mobile devices whether owned by either a single user or multiple users. In some cases, maintaining privacy of some information may be a concern for the user. To mitigate this concern, the user can control which information is openly displayed on the interactive surface and which information is concealed or hidden from "public" view.

In addition to providing enhanced input/output resources for mobile devices, the interactive surface can also provide temporary or long-term data storage for mobile devices, most of which tend to have limited storage capacities. Furthermore, the interactive surface allows data or objects such as files, documents, and photographs to be moved or copied between one or more mobile devices. The interactive surface can also permit background monitoring of various tasks or program applications such as email, file transfers, program updates, and the like while the user is more actively involved in another task or application. Moreover, the interactive surface provides a rich user interface for mobile devices that are characteristically deficient in display capabilities and augments the usability and visibility of such devices.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION

Figure 1:
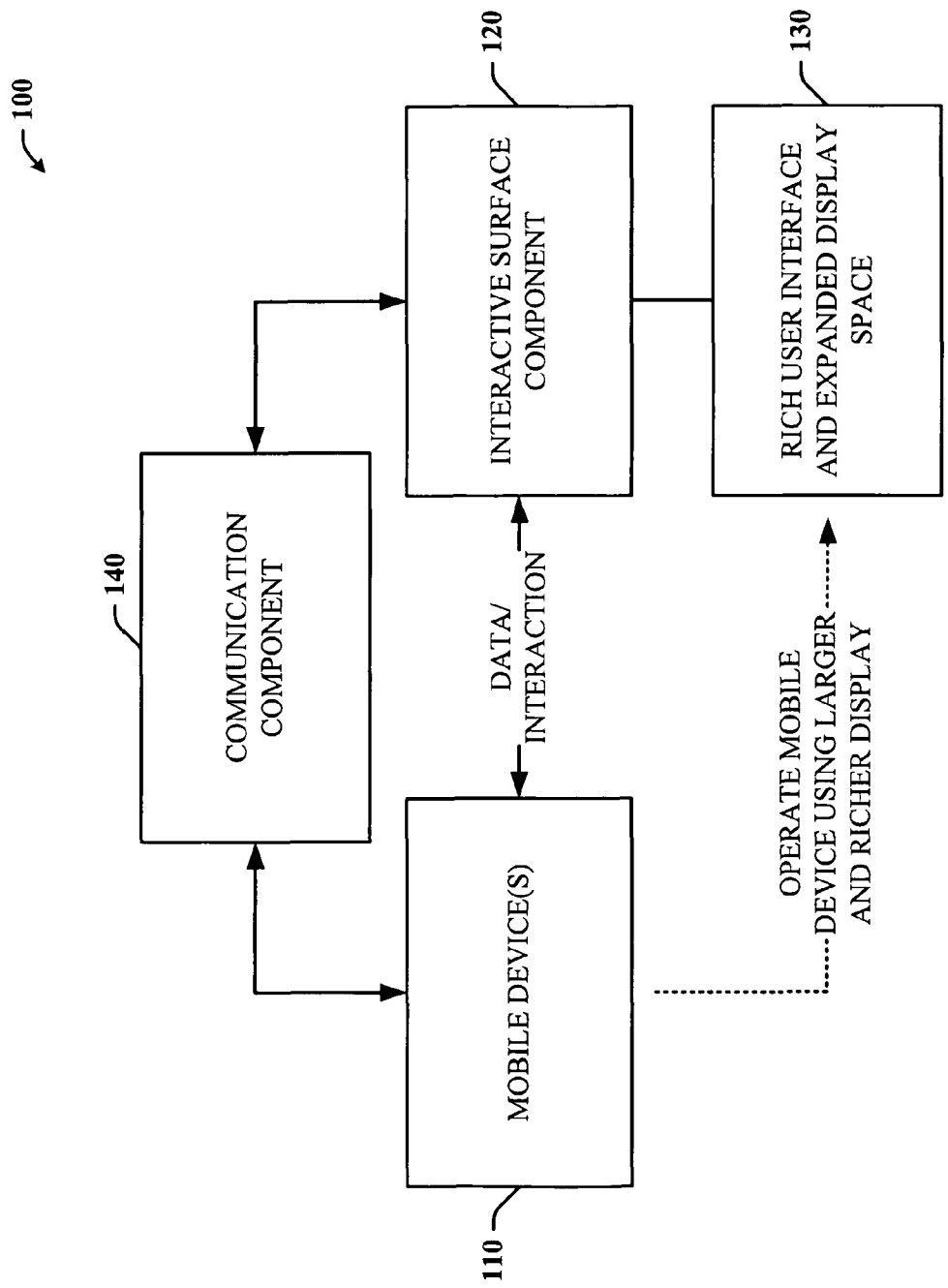
FIG. 1 is a block diagram of an interactive surface component interfacing with one or more mobile devices to facilitate extending input/output capabilities for resource deficient mobile devices.

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject systems and/or methods can incorporate various inference schemes and/or techniques in connection with recognizing and identifying mobile devices and ritualistic or routine interactions there-between. For example, an exemplary interactive surface component can learn to perform particular actions or display certain information when one or more particular mobile devices connect to the surface component. In practice, for instance, imagine that when a smartphone device named BOBSTAR establishes a connection to the surface, the surface is trained to automatically show the address book in its display space. Similarly, when PDA-1 and PDA-101 reconnect to the interactive surface component, their state of activity can resume from their previous connection.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is a general block diagram 100 of the interaction between one or more mobile devices 110 and an interactive surface component 120. The one or more mobile devices 110 can include but is not limited to a cell phone, smartphone, PDA, tablet PC, laptop computer, watch, wearable computing device, and/or memory card. The interactive surface component 120 can be oriented horizontally (e.g., tabletop) or vertically and include a processor (not shown) as well as a display screen 130 that provides a rich user interface and a substantially larger display space than the mobile device 110. A communication component 140 creates and/or controls a portal or channel that allows the interactive surface component 120 to "talk" to the mobile device 110 when a connection between them is initiated.

The mobile device 110 often lacks adequate display space or input capabilities. However, when the mobile device 110 establishes a connection (e.g., WiFi, infrared, etc.) with the interactive surface component 120, the display space of the interactive surface component 120 can act as an additional input/output resource for the device 110. In particular, information displayed on the mobile device can be mirrored and enhanced and/or enlarged on the surface component 120. As a result, a user can more readily and with greater ease enter and/or manipulate information on his/her mobile device 110 by way of the larger display space and additional input capabilities of the surface component 120.

Connection to the surface component 120 can be established in a wireless manner such as by contacting the device to at least a portion of the surface component 120 or by placing the device 110 on the surface component 120. When the appropriate contact is made, the surface component 120 can read an identification marker on the device 110 to identify the type and/or name of the device 110. The identification marker can be a barcode, an RFID tag, or some other visual pattern or code unique to the particular mobile device that can be read by the surface component 120.

As demonstrated in the later figures, a PDA or tablet PC placed on the surface 120, for example, can use the surface 120 as a personal portal into the data displayed on the PDA or tablet PC. This portal provides an additional parallel plane of interaction for the user. When multiple devices and multiple users are connected to the surface component 120, the position and orientation of each device 110 can be sensed and used to determine where each different user is located (e.g., sitting) around the surface 120. In practice, for instance, the position and orientation of the device's identification marker can be employed to determine the device's overall position and orientation on the surface relative to other devices located thereon.

Figure 2:
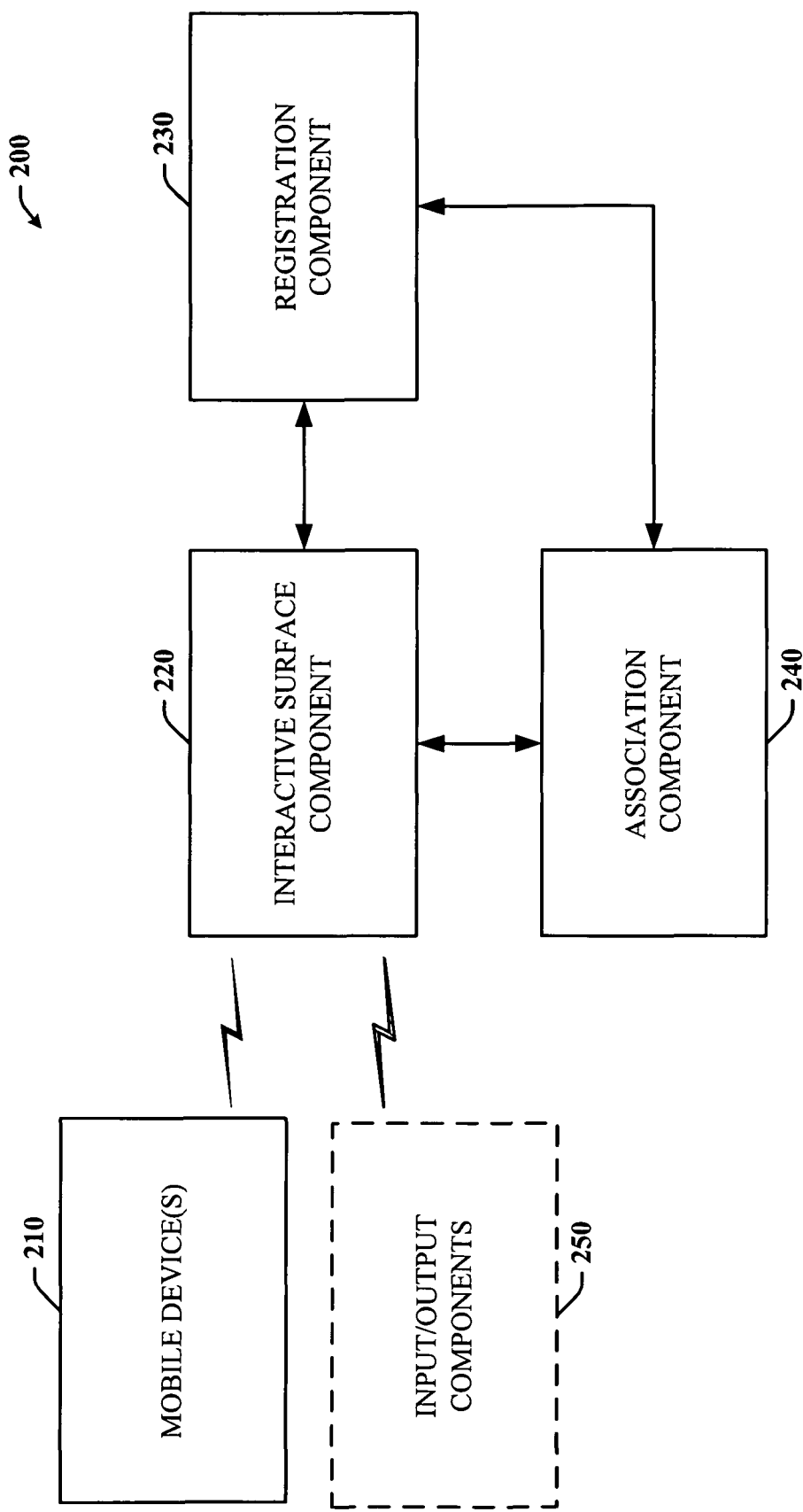
FIG. 2 is a block diagram of an interactive surface component establishing a connection with one or more mobile devices to facilitate extending input/output capabilities for resource deficient mobile devices.

Referring now to FIG. 2, there is illustrated a block diagram of a system 200 that facilitates communication between multiple mobile devices and optionally, one or more input/output components by way of an interactive surface. The system 200 can include one or more mobile devices 210 that desire a connection with an interactive surface component 220. To fully establish communication between the device 210 and the surface 220, the interactive surface component 220 can employ a registration component 230 that identifies the type and/or name of the mobile device(s) 210 and calls the appropriate operating protocols for each device 210. The registration component 230 can also extract the information currently displayed on the mobile device 210 and project such information on the interactive surface component 220. In the end, the connection and interaction between the interactive surface component 220 and the device 210 are transparent to the user.

When a plurality of mobile devices 210 are connected to the interactive surface component 220 and interaction between at least two devices 210 is desired, an association component 240 can be employed to facilitate the passage of data from one device to another via the interactive surface component 220. More specifically, the association component 240 can group related devices together or suggest such groupings to the user(s). The relatedness of devices can be determined in part by examining their spatial relationships and physical proximity to each other. For example, devices belonging to the same group are more likely positioned closer together. It should be appreciated that the at least two devices can be different, alike, or even identical.

The association component 240 can also be employed to couple or link at least one mobile device 210 with one or more input/output components 250 also connected to the interactive surface component 220. Examples of input/output components 250 include but are not limited to a keyboard, mouse, stylus, pen, and/or printer. Because most if not all mobile devices have limited input capabilities, a user may desire to make use of the richer and larger display space of the interactive surface component to enter data into the device. Therefore, the user may desire to connect a wireless keyboard to the interactive surface component 220. If multiple devices are connected to the interactive surface component 220, the keyboard can be readily associated and/or employed with such devices without needing to perform complicated pairing procedures each time the device or user changes. To mitigate security concerns when using such input components, on-screen buttons or controls located on the interactive surface component 220, and/or on the devices themselves, may be utilized to indicate which device 210 is currently linked to the respective input component 260.

Figure 3:
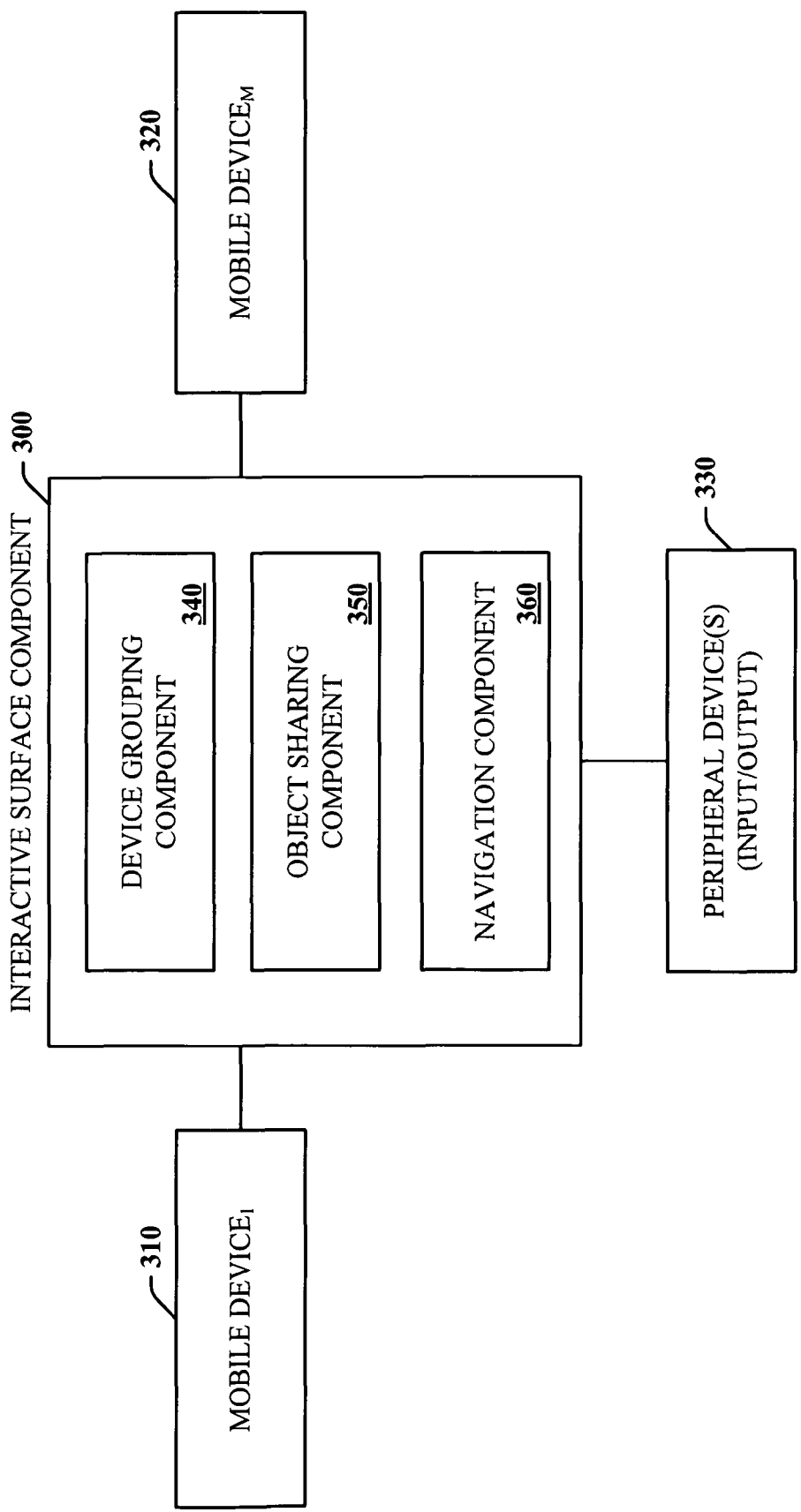
FIG. 3 is a block diagram of exemplary functional interactions between multiple mobile devices, one or more peripheral components, and an interactive surface component to facilitate transparent user interaction with the mobile devices.

Referring now to FIG. 3, there is a block diagram of an interactive surface component 300 interfacing with at least a first 310 and a second 320 mobile device as well as one or more peripheral input/output devices 330. When multiple mobile devices are connected to the interactive surface component 300, a variety of components can be utilized to assist in the interaction between such mobile devices. The interactive surface component 300 provides a working medium to bind together multiple devices regardless of their make or model. Virtually any device with some form of connectivity to the interactive surface component 300 can participate and be bound together via a device grouping component 340. The device grouping component can bind multiple heterogeneous devices using at least one of the following: a unique visual pattern or identification marker on the device, physical proximity, alignment of primary orientation vectors, and/or explicit controls located on the interactive surface. For example, the unique visual pattern (e.g., barcode) can be employed to bind an object (e.g., keyboard, mobile device, etc.) seen on the interactive surface to the wireless information being received. Regarding physical proximity, devices placed close together can be grouped, connected, or otherwise bound in some way to each other for communication or data sharing purposes.

Next, imagine that a mouse, keyboard, and PDA are all placed on the interactive surface component 300 and all face the same direction. Based on the alignment of their primary orientation vectors, these three devices can be bound together and treated as a group. As a result, the user can have high-bandwidth text entry on his/her PDA.

When multiple devices are connected to the interactive surface component, data can be shared or moved between such devices by way of an object sharing component 350. For example, data such as files, documents, or photographs can be moved or copied to the interactive surface from the first device 310. Using a navigation component 360 such as on-screen controls (e.g., touch-sensitive surface, command buttons, etc.), the data can be moved or copied to the second device 320 as desired by the user. Alternatively, the data can be stored on the interactive surface component 300 for later retrieval and use.

In general, the navigation component 360 can assist the user in viewing and manipulating the relevant data on the interactive surface component 300. That is, the user can navigate through information displayed on the interactive surface component as if he/she were navigating through the same information on the mobile device to create a seamless and transparent experience for the user.

Figure 4:
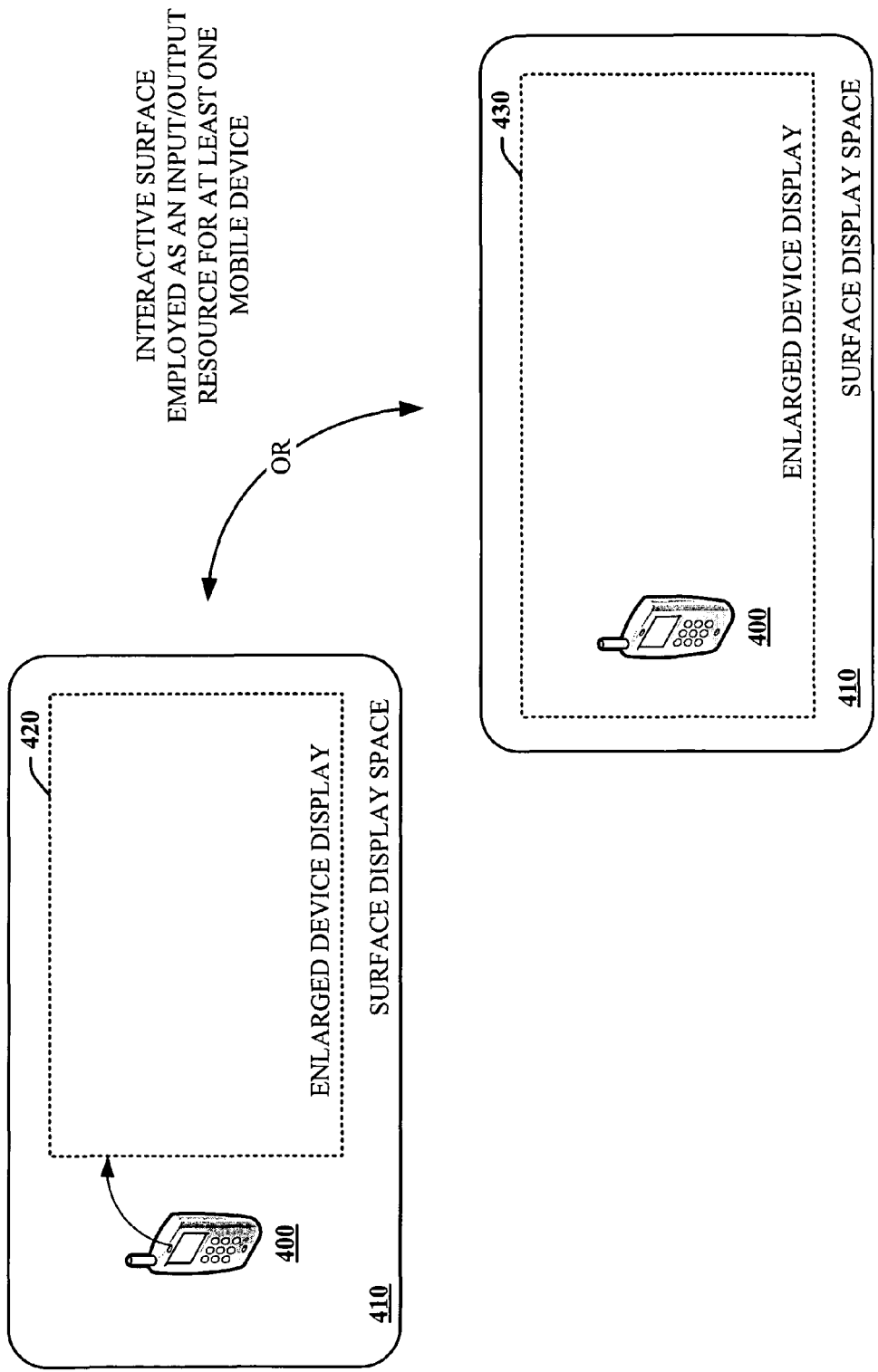
FIG. 4 is a block diagram of an exemplary interactive surface component interfacing with at least one mobile device to facilitate extending the input/output capabilities of the mobile device.

Turning now to the next several figures, exemplary views of the interactive surface component interfacing with one or more mobile devices as described hereinabove are illustrated. For instance, FIG. 4 depicts the interactive surface component as employed as an additional input/output resource for any mobile device that has little or no display space. As shown in this figure, the mobile device 400 is placed on the surface component (in the display space) and after a connection is established to the surface component, the display of the mobile device 400 can be projected onto a portion of the surface display space 410 (420) or can consume substantially all of the display space 410 (430). When more than one mobile device is connected to the interactive surface component, the surface display space can be divided such that each device occupies a particular portion of the display space 410 to display their content. The surface display space can mirror the device display and/or offer enhanced customization and visualization controls to manipulate data intended for the device. Hence, the surface component provides a direct link to the user interface of the device.

In practice, for example, a user could place a cell phone on the interactive surface component (display space). When a connection is established to the surface component, the cell phone could automatically be transitioned to speakerphone mode for the duration of the connection or until the user turns it off or manually switches the mode. The display space could then show a list of contacts with a picture for each contact whereby touching a picture initiates a call or another action specific to that person (e.g., opening a shared web browser on the interactive surface).

As another example, the user could establish a connection between his/her watch and the interactive surface component. When connected, the surface display space can show various forms to the user to customize the information which the watch intends to display. Thus, the user can achieve customization of his/her watch using the enhanced controls of the interactive surface component rather than dealing with an impoverished display and a paucity of buttons on the watch to achieve the same task.

It should be appreciated that the view of information in the surface display space can change to present various options for interaction with the device. Therefore, the information in view in the surface display space may not always mirror the mobile device display. When the device is removed or picked up from the surface component, the connection can be severed automatically as a result and the display on the mobile device can stay the same or return to a default or standby appearance. In some instances, the user can be asked to verify whether disconnection is desired before the connection is severed.

Figure 5:
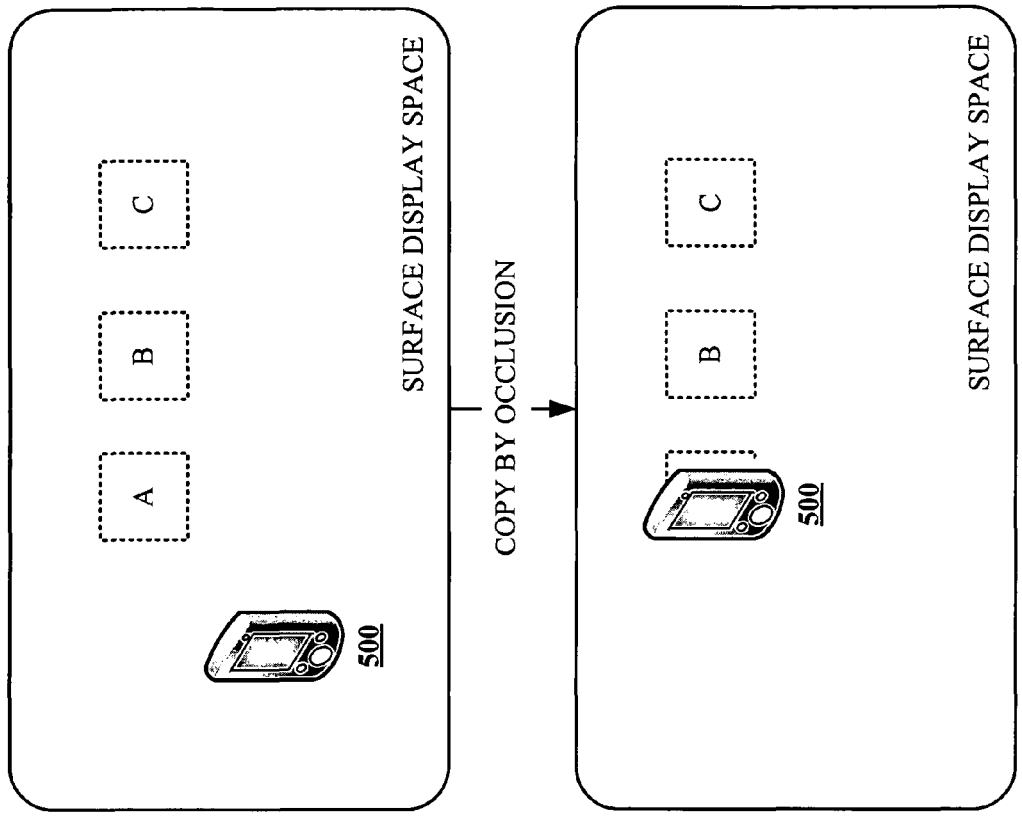
FIG. 5 is a block diagram of an exemplary interactive surface component interfacing with at least one mobile device in a copy-by-occlusion operation.

Moving on to FIG. 5, a data sharing operation that can be performed by a mobile device is demonstrated. In particular, a user places his/her device 500 on the surface display space of an interactive surface component and establishes communication therewith. In the surface display space, there is a plurality of data objects: A, B, and C, for example. These objects may have been put there by another mobile device (not shown) or by the device 500 at an earlier time. Suppose that the user now desires to add object A to his/her device 500. To do so, the user can put or drag the device 500 over the desired object(s). An on-screen command/button can be invoked as well. Placing the device 500 over the desired object (with or without invoking the command) essentially moves or copies the object(s) to the device 500. This can be accomplished in part by the use of invisible or visible tags on the objects. For example, each object can include a tag or marker which must be "scanned" or otherwise "hit" by the device in order for the object to be copied or moved to the device. When dealing with a group of objects, each object need not be occluded separately. Rather, the group can be moved or copied as a whole when occluded or when the group's tag or marker is somehow hit by the device 500.

Figure 6:
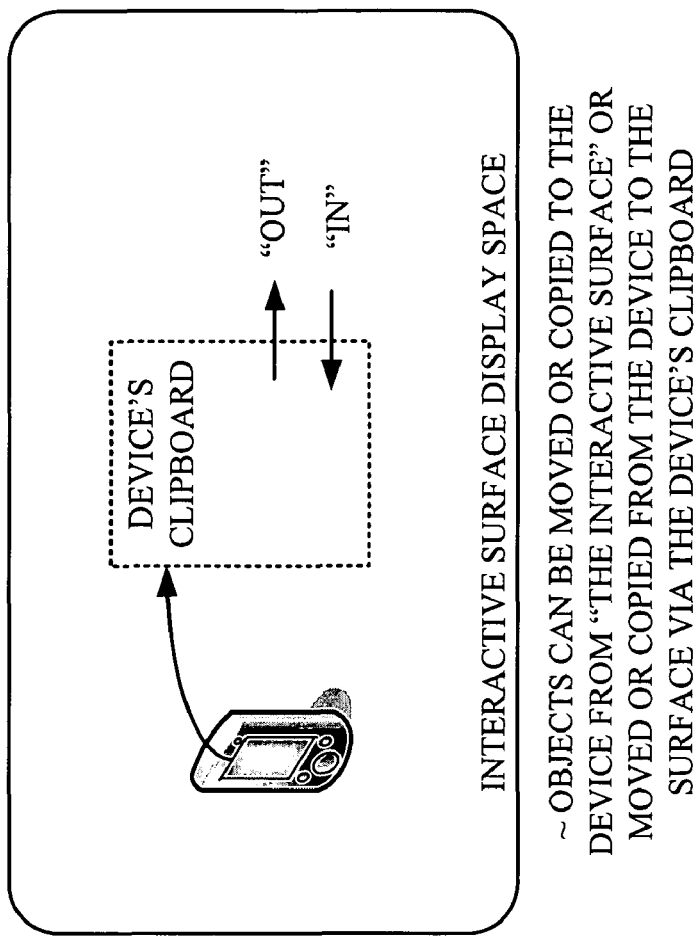
FIG. 6 is a block diagram of an exemplary interactive surface component interfacing with at least one mobile device in an object sharing-transfer operation.

In FIG. 6, a mobile device's clipboard or data store can be displayed in the surface display space next to the respective device. By displaying the device's clipboard in this manner, a user or other users viewing the surface display space can drag, move, or copy objects in and out of the clipboard. To further facilitate the movement of objects into and out of the clipboard, in/out targets on the clipboard can be employed to explicitly indicate the desired placement of the object.

Figure 7:
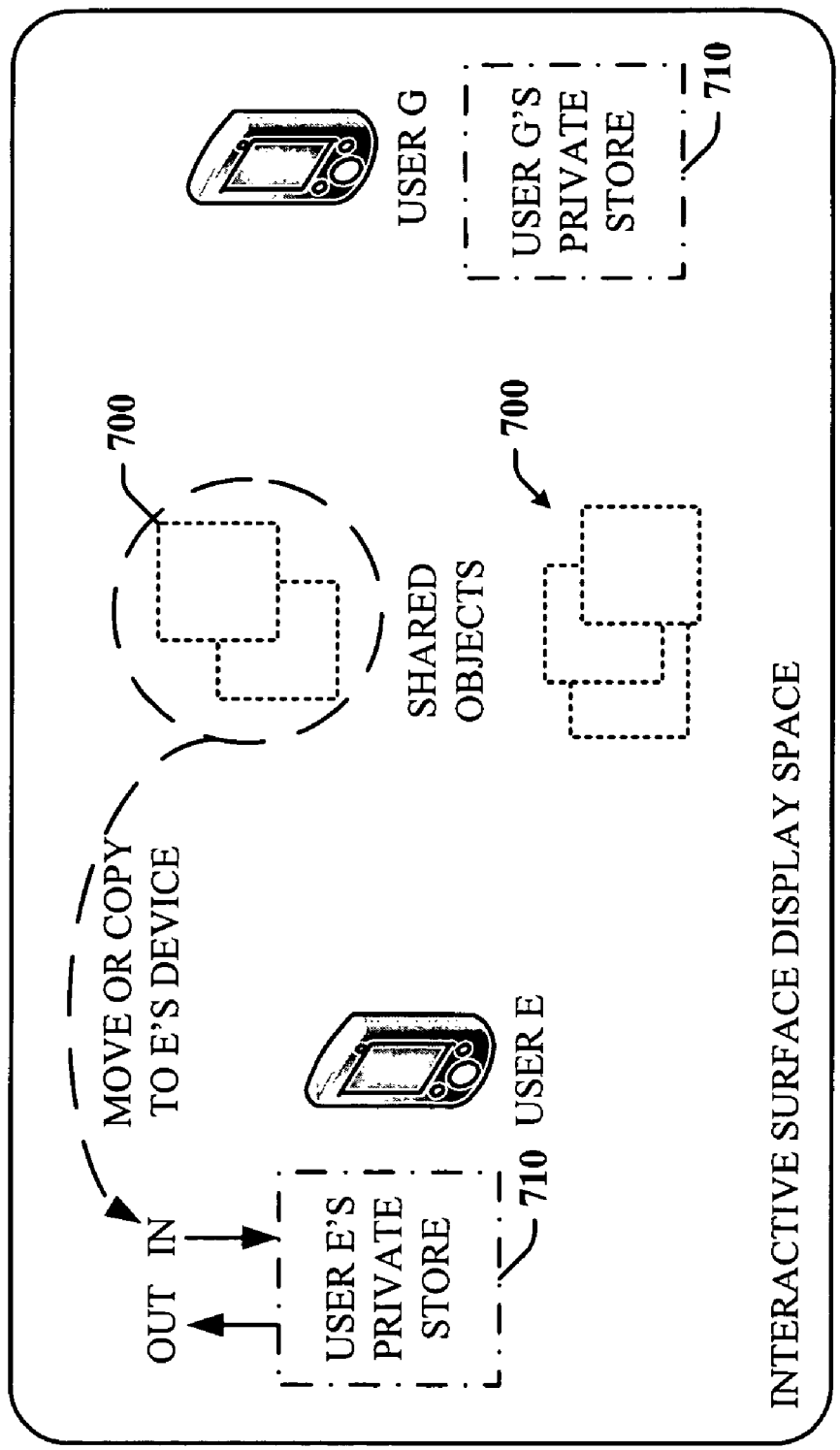
FIG. 7 is a block diagram of an exemplary interactive surface component interfacing with at least one mobile device whereby users can choose to keep their data private or hidden from other users interacting with the surface component.

FIG. 7 builds upon the clipboard aspect of FIG. 6. More specifically, users can keep the contents of their clipboard or data store private, hidden, and/or even separate from other users' data stores that are also interacting with the surface display space in some manner. As shown in the figure, shared objects 700 can be maintained in the surface display space whereas personal objects are maintained on the appropriate mobile devices—via their private stores 710. This mitigates confusion when collaborating or sharing information among multiple users and/or multiple devices.

Figure 8:
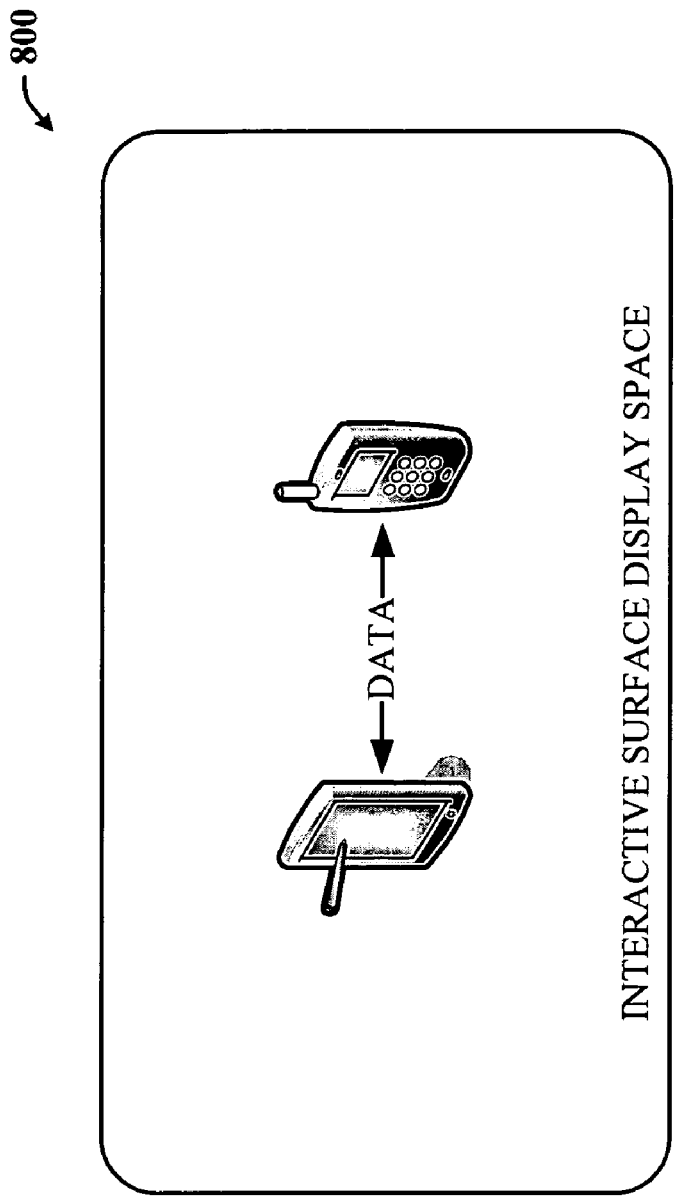
FIG. 8 is a block diagram of at least two mobile devices otherwise unable to communicate with each other which are interacting with each other via an interactive surface component.

The diagram 800 in FIG. 8 illustrates that multiple devices which are otherwise unable to communicate (e.g., share data) with each other but can now communicate and interact with each other via the interactive surface component. For communication between devices to be successful, both devices are connected to the interactive surface component. The connection can be wireless and in some cases, may even be remote. That is, one or more of the devices are not physically present but rather virtually present on the interactive surface. Multiple devices can connect to the interactive surface in a number of ways. One such way is through the use of explicit surface controls as demonstrated in FIG. 9, infra.

Figure 9:
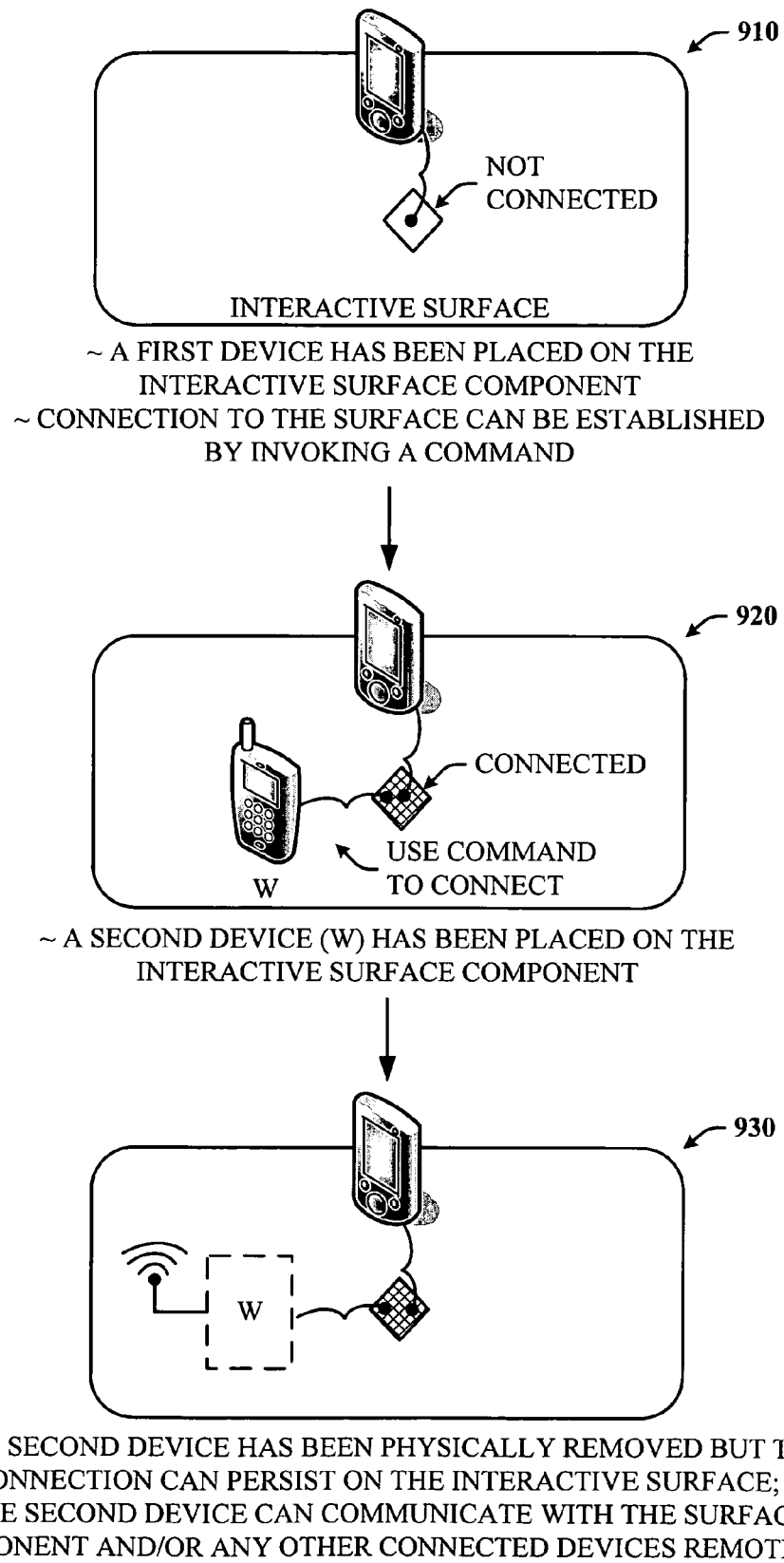
FIG. 9 is a block diagram of an exemplary connection scheme in which multiple mobile devices can connect to an interactive surface component to maintain a physical or remote connection with the surface component.

FIG. 9 demonstrates how multiple devices (e.g., a tablet PC and smartphone are depicted but could also be only tablet PCs, a combination of any other devices (at least two), etc.) can become connected using the interactive surface component as a medium to enable such devices to learn or determine the proximity of other devices and their spatial relationship to those devices. First at 910, a first device is placed on the interactive surface (display space). The interactive surface shows a "cord" coming out of the device to illustrate the potential for connection. The "cord" can be graphically rendered on the interactive surface when the presence of the first device is detected. At this point, no other device including the first device is connected yet—as indicated by the "white" connection target.

At 920, a second device (W) is put down on the interactive surface. A connection between the two devices can be hypothesized by showing both cords connected to the connection target (shaded to indicate a connection). The user can touch the target area or some other symbol, icon, or command to connect the devices, or touch and hold it (e.g., target area, symbol, icon, command button, etc.) to bring up other options.

At 930, both the first and second devices are connected to each other. If one of the devices is removed from the interactive surface, the connection can be automatically broken. Alternatively, the connection can persist. This can allow the user to pick up his/her device and use it as a private display, or even to wander about at some distance from the interactive surface while staying connected to his/her colleagues positioned at the interactive surface. When the second device has been moved some distance away, such as down the hall or to another room, a virtual indication of the connection to the second device W can be shown on the surface. The surface can display an "antenna tower" to provide feedback of the ongoing connection, and a connection icon can give local users the option to close the connection to the second device W.

While the second device W is away or interacting remotely, the local screen on W can show similar feedback indicating the connection to the surface (and the first device) as well as the option to close that connection. In addition, the local screen on the device can be manipulated to reflect or clarify any activity occurring on the interactive surface. For instance, points of connection can be displayed on the mobile device to indicate that they are available to the device. A matching connection on the surface could tie directly into that point graphically (on the same side of the display, corner, etc.).

As information is being communicated between devices via the surface, such as between the first and second devices, one or more graphics or graphical illustrations can be employed to visually indicate the status of activity between at least two devices. For example, the connection between any two devices can glow or pulse to depict the flow of data and/or the current state of the connection. This can assist the user(s) in determining the quantity or type of information that has been shared or passed, time remaining to complete the transfer, and/or time required to complete the transfer. Graphics displayed on the interactive surface can also be utilized to terminate, reassign, or add connections between devices. As a result, the user can interact with the relevant connection(s) directly rather than through the various devices.

Figure 10:
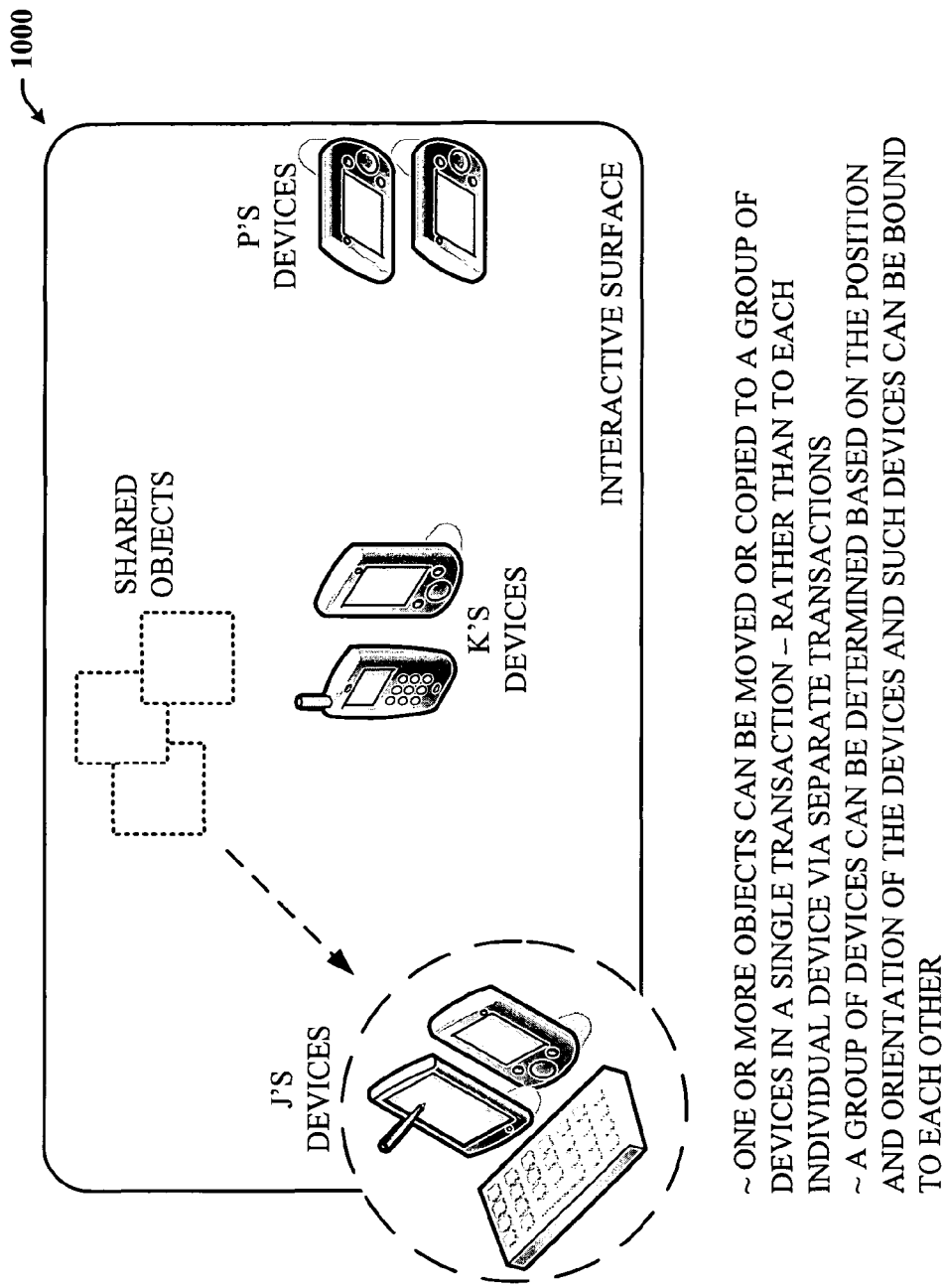
FIG. 10 is a block diagram of an exemplary interactive surface component interfacing with at least one group of mobile devices as determined by the orientation and/or position of such mobile devices.

Turning now to FIG. 10, the diagram 1000 illustrates that one or more objects can be moved or copied to a group of devices in a single transaction instead of moving or copying each object to each device within the group. Devices can be grouped according to their relative position and orientation on the interactive surface. For example, those devices positioned more closely together and/or oriented in the most similar manner can be implicitly or explicitly grouped together by the interactive surface. When one device is removed from the group and disconnected from the surface, the surface can remember that such device belonged to a particular group. Thus, when that device is reconnected to the surface and at least one other device from the group is still connected, the interactive surface can automatically associate the reconnected device to the group (and/or any other devices within the group).

When multiple devices are present on the interactive surface but communication is only desired with one particular device, the spatial relationship between such devices can assist in identifying the desired device. In practice, for example, imagine that JOHN wants to share pictures with JANE. Their devices as well as 2 others belonging to other users are connected to the interactive surface. To facilitate the exchange of the pictures between only JOHN's and JANE's devices, they can point their devices to face each other. Alternatively, they can orient them in a similar manner and within close proximity of each other. Other variations are possible as well to indicate that communication between only the designated devices is desired. Commands or additional controls associated with the interactive surface may also be employed.

The interactive surface also remembers which devices have previously been placed upon it, and what tasks or files were used among the devices. If the same set of devices is placed on the interactive surface again, the surface may offer to restore the old state of the surface. This allows several colleagues to temporarily stop working on a project, and then return to it later just by placing their same devices on the table. A single user could similarly restore the workspace for a project just by placing a tagged paper folder or electronic device used specifically for that project on the table. For example, placing an MP3 player on the table would bring up the user's music files and web sites he/she had last used for sharing and purchasing music.

Devices on the interactive surface and connected thereto can also operate as storage containers for data and proxies similar to network folders or shares. For instance, a PDA can be a proxy that points to a URL for a network share. In this type of arrangement of devices on the interactive surface, the interactive surface can facilitate visualization of a wireless network.

The interactive surface can also serve as an extended workspace area for a user who desires additional screen real estate. For example, the user can connect his tablet PC to the interactive surface and create a workspace arranged in the surface display space around the tablet PC. The user can use various hand gestures or other navigation controls to bring new documents onto the tablet screen (or remove them from it). This alleviates screen real estate restrictions on the tablet when working with lots of documents. The interactive surface provides a large peripheral view of backburner tasks and programs like email that the user can monitor even when not directly using them.

Mobile devices such as a tablet PC, for instance, can also be placed in a slate mode on the interactive surface to provide an additional horizontal layer. The user can dynamically transition to a vertical surface by flipping up the screen to be perpendicular to the surface. This can be sensed by the surface which can give a separate view that is private. Alternatively or in addition, the surface might switch from an overhead plan view on the tablet PC to a 3D immersive view. To mitigate undesired occlusion of any portion of the display space, the tablet PC can be placed near the edges of the display space.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 11:
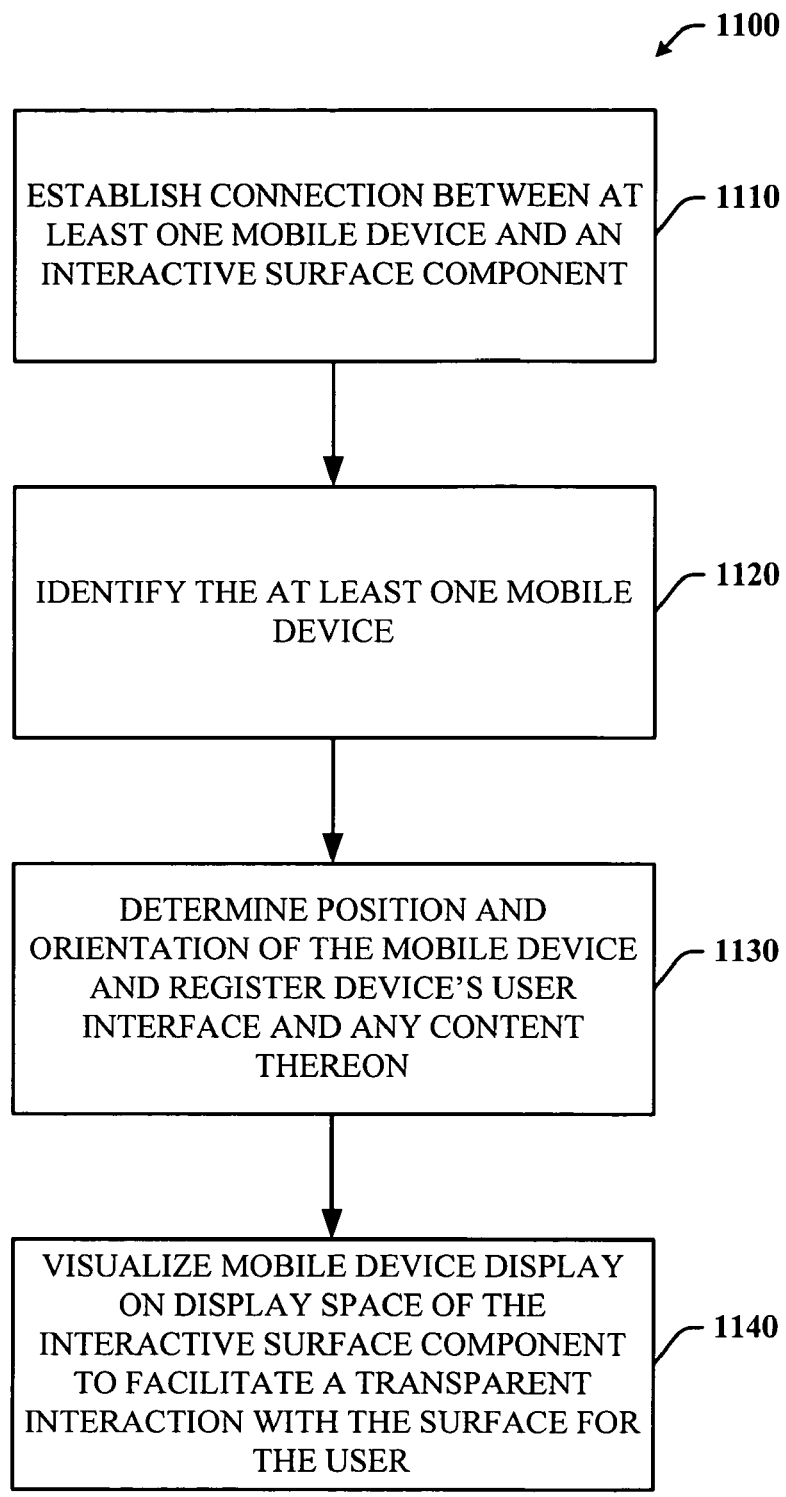
FIG. 11 is a flow chart illustrating an exemplary methodology that facilitates extending input/output capabilities for resource-poor mobile devices.

Referring now to FIG. 11, there is a flow diagram of an exemplary method 1100 that facilitates extending input/output capabilities for resource-poor mobile devices. The method 100 involves establishing a wireless connection between at least one mobile device and an interactive surface component at 1110. The mobile device can be any one of a cell phone, smartphone, PDA, tablet PC, laptop computer, watch, wearable computing device, memory stick, and/or memory card. The interactive surface component can be oriented in a horizontal manner similar to a table or in a vertical manner.

At 1120, the at least one mobile device can be identified by way of its unique visual pattern (e.g., barcode, RFID tag, etc.). Once identified by name and/or device type (make and/or model), the interactive surface component can determine the position and orientation of the mobile device as it rests on its surface and can register the device's user interface and any content appearing thereon at 1130. At 1140, the contents of the mobile device display can be visualized in the display space of the interactive surface component to facilitate transparent user interaction with the interactive surface. In other words, the mobile device display can be mirrored on the larger and richer user interface of the interactive surface component. As a result, the user can interact with his/her mobile device as usual with the assistance of the expanded input/output capabilities of the interactive surface.

Figure 12:
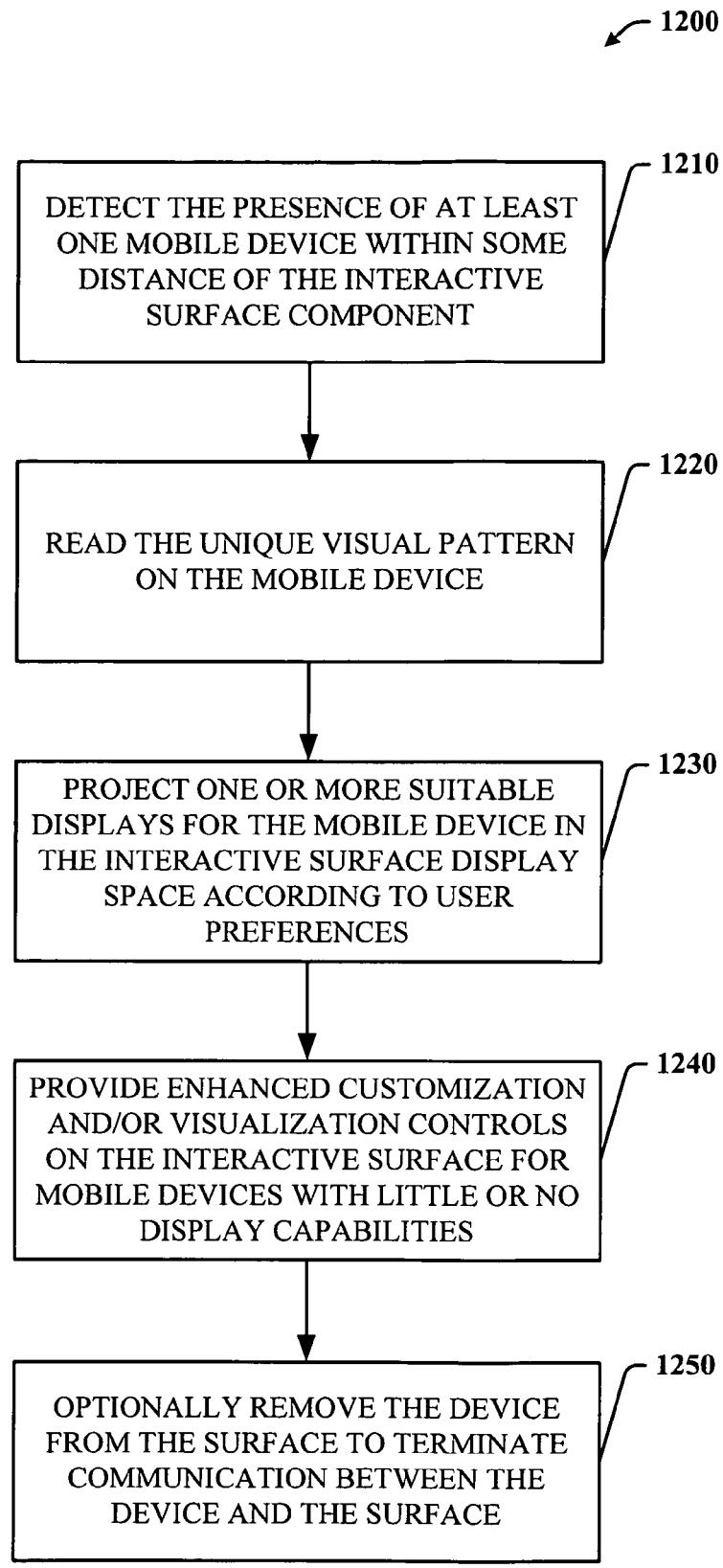
FIG. 12 is a flow chart illustrating an exemplary methodology that facilitates enhancing user interaction with one or more mobile devices through the use of an interactive surface.

Referring now to FIG. 12, there is illustrated a flow diagram of an exemplary method 1200 that facilitates enhancing user interaction with one or more mobile devices through the use of an interactive surface. The method 1200 involves detecting the presence of at least one mobile device within some distance of the interactive surface component at 1210. For example, detection can occur when the device is placed on the interactive surface or when the device is within a physical proximity of the interactive surface. Once detected, the visual identification code or pattern on the device can be read at 1220. By doing so, the interactive surface can determine the most appropriate protocols to use to communicate and/or interact with the mobile device.

At 1230, the interactive surface can project one or more suitable displays specific to the mobile device onto the display space of the interactive surface. For instance, the user or the device itself may have set a default screen to view when initially connected to the interactive surface. At 1240, the interactive surface can provide enhanced customization and/or visualization controls particularly for mobile devices with little or no display capabilities or inadequate input or navigation controls or for users who desire additional workspace. At 1250, the device can be optionally removed from the surface to terminate or end communication and interaction with the interactive surface. Termination can be automatic or can be affirmatively verified by the user before the connection is ended. When transferring or sharing data between the interactive surface and the device, the connection can remain open for the duration of the data exchange and end as soon as the exchange is completed.

In some cases, the device can maintain a virtual presence on the interactive surface and communicate with the interactive surface from a remote location. This can provide users with some flexibility when interacting with the interactive surface so that they do not always need to disconnect and then re-connect if they need to step away from the interactive surface with their device for a brief time. The remote connection can be terminated from either the interactive surface or from the remote device.

Figure 13:
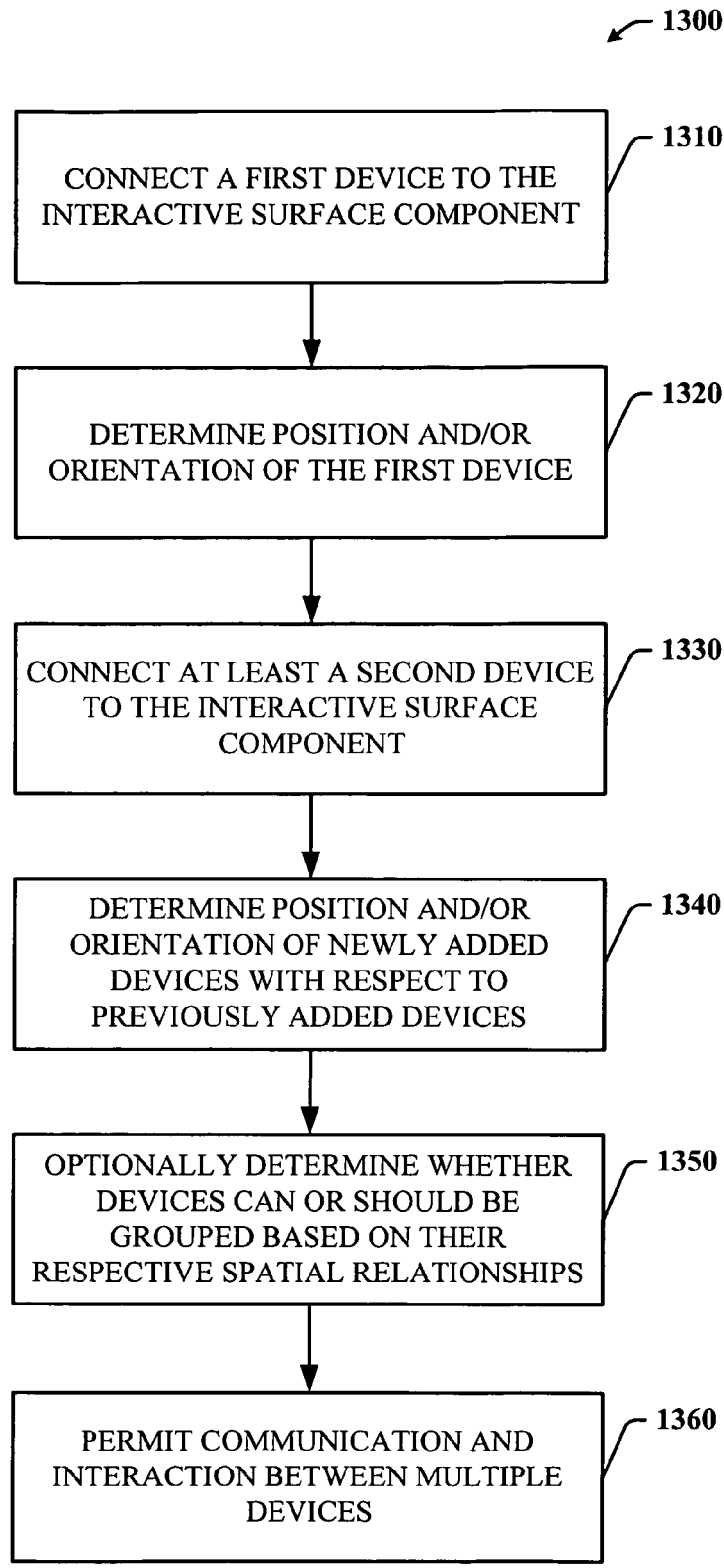
FIG. 13 facilitates communication including data sharing between multiple mobile devices via the interactive surface component.

Turning now to FIG. 13, there is illustrated a flow diagram of an exemplary method 1300 that facilitates communication including data sharing between multiple mobile devices via the interactive surface component. The method 1300 involves connecting a first device to the interactive surface at 1310 and determining the position and/or orientation of the first device at 1320. At 1330, at least a second device can be connected to the interactive surface. The position and/or orientation of the second device and any other subsequently added device can be determined with respect to the previously added devices at 1340 to obtain an overall representation of the spatial relationships between the connected devices.

At 1350, it can be optionally determined whether some devices can or should be grouped according to their respective spatial arrangements on the interactive surface. For instance, one user may have two mobile devices and a wireless keyboard connected to the interactive surface. The interactive surface can suggest a grouping of these devices to facilitate data sharing and input capabilities. Alternatively, various teams of users involved on the same project may be interacting with the interactive surface. Thus, each team of users can have their devices grouped together to make data sharing more efficient. At 1360, communication and/or interaction between the multiple devices can be performed. Examples of such types of interaction include moving and copying data between devices or groups of devices, viewing data from the devices on the interactive surface, sharing input devices such as a wireless keyboard between different users and for different devices without requiring complex pairing procedures, etc.

Figure 14:
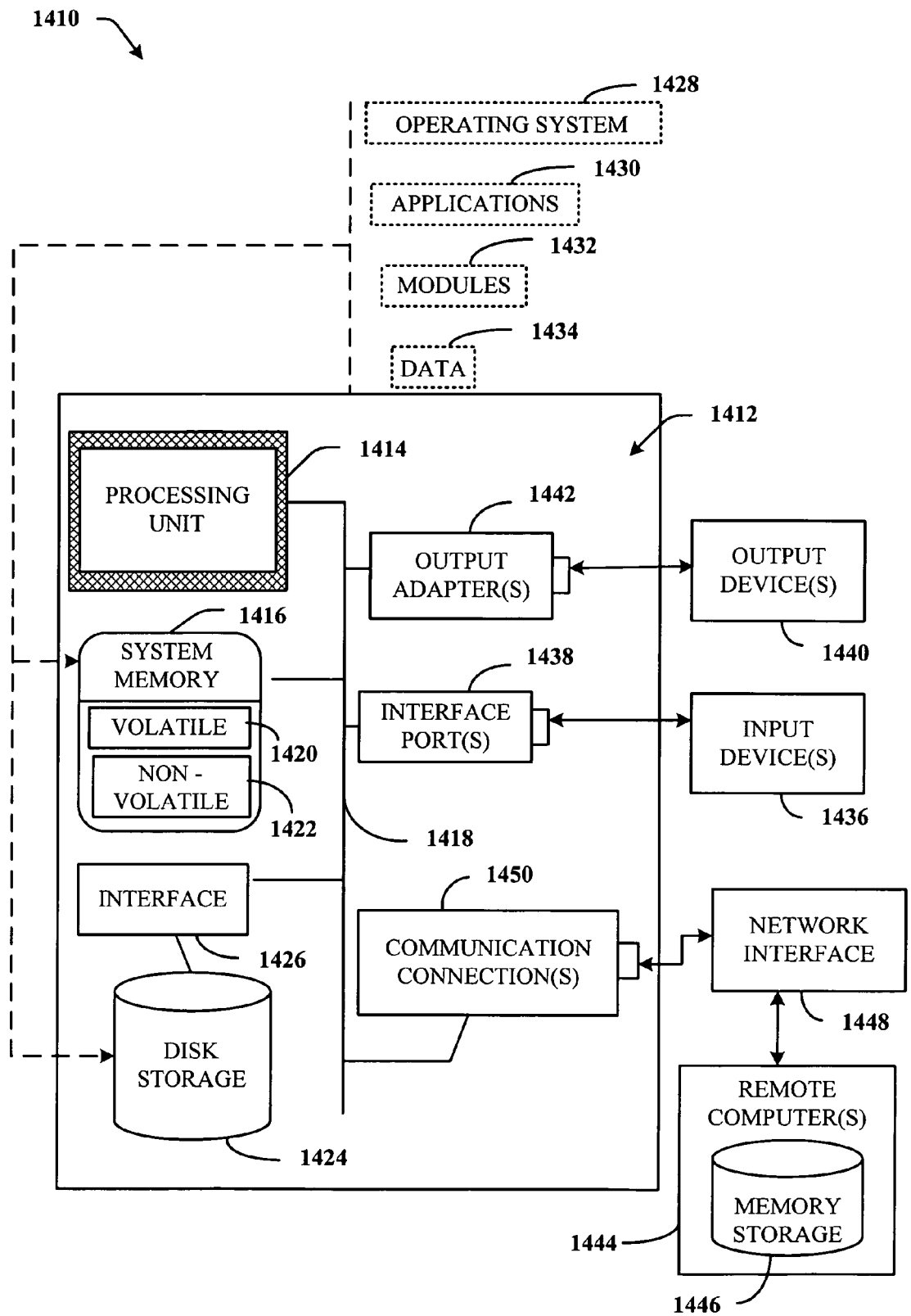
FIG. 14 illustrates an exemplary environment for implementing various aspects of the invention.

In order to provide additional context for various aspects of the subject application, FIG. 14 and the following discussion are intended to provide a brief, general description of a suitable operating environment 1410 in which various aspects of the subject application may be implemented. While the system(s) and/or method(s) is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1410 is only one example of a suitable operating environment and is not intended to suggest any limitation as to the scope of use or functionality of the system and/or method. Other well known computer systems, environments, and/or configurations that may be suitable for use with the system and/or method include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 14, an exemplary environment 1410 for implementing various aspects of the system and/or method includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/nonremovable, volatile/nonvolatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the subject system and/or method can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412 and to output information from computer 1412 to an output device 1440. Output adapter 1442 is provided to illustrate that there are some output devices 1440 like monitors, speakers, and printers among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates communication between various heterogeneous mobile devices, that extends input/output capabilities of the mobile devices comprising:
   a memory to store instructions for facilitating communication between various heterogeneous mobile devices;
   a processor for executing the instructions;
   an interactive surface comprising input/output resources wherein the interactive surface provides for multiple mobile devices to connect thereto and the interactive surface is programmed to identify each mobile device of the multiple mobile devices thereon;
   a registration component that identifies various mobile devices according to at least one of a unique visual or non-visual pattern associated with each device and calls a protocol corresponding to the particular mobile device based at least on having identified a particular mobile device of the multiple mobile devices;
   an association component that facilitates passage of data between mobile devices by forming a group, wherein the association component groups related mobile devices based at least in part on position and orientation of a first mobile device relative to position and orientation of a second mobile device to facilitate interaction between the mobile devices or interaction between the mobile devices and other devices connected to the interactive surface;
an object sharing component that allows data to be shared between mobile devices; and
a navigation component that allows data to be moved or copied from one mobile device that is connected to interactive surface to another mobile device that is connected to the interactive surface.

2. The system of claim 1, the association component creates at least one communication channel when the first mobile device and the second mobile device are placed on the interactive surface.

3. The system of claim 1, the association component maintains at least one communication channel with the first mobile device when the first mobile device is within a physical proximity of the interactive surface.

4. The system of claim 1, the interactive surface is oriented in a horizontal manner.

5. The system of claim 1, the interactive surface projects various displays specific to each of the mobile devices onto the interactive surface's display space for easier viewing and data manipulation by a user.

6. The system of claim 1, wherein the interactive surface is programmed to identify at least one mobile device comprising at least one of:
a tablet PC, a laptop computer, a watch, a wearable computing device, or a memory card.

7. The system of claim 1, wherein the association component couples at least one mobile device with one or more input/output components.

8. The system of claim 1, wherein the interactive surface recalls another particular mobile device that has been placed on the interactive surface and tasks and files associated with the another particular mobile device.

9. The system of claim 1, wherein the interactive surface is programmed to identify at least one mobile device comprising at least one of a cell phone, a smartphone, or a personal digital assistant (PDA).

10. A method that facilitates extending input/output capabilities of mobile devices comprising:
establishing a connection between multiple mobile devices and an interactive surface, the establishing the connection between a particular mobile device of the multiple mobile devices and the interactive surface including:
responsive to the particular mobile device being placed on the interactive surface, the interactive surface identifying the particular mobile device;
calling one or more protocols specific to the particular mobile device to enable communication and interaction between the interactive surface and the particular mobile device; and
responsive to the protocol, the particular mobile device becoming a particular connected mobile device;
determining, by the interactive surface, a position and orientation of each mobile device having a connection to the interactive surface;
determining, by the interactive surface, a spatial relationship of the multiple mobile devices having a connection to the interactive surface, wherein determining the spatial relationship comprises the interactive surface ascertaining the position and orientation of each connected mobile device relative to another connected mobile device;
grouping, by the interactive surface, the connected mobile devices based in part on the spatial relationship of the connected mobile devices to form a group of connected mobile devices; and
moving and copying data between connected mobile devices or groups of connected mobile devices.

11. The method of claim 10, the establishing the connection between the particular mobile device and the interactive surface further comprising:
reading unique visual or non-visual patterns of the particular mobile device to identify the particular mobile device.

12. The method of claim 10, further comprising employing input controls on the interactive surface to more readily customize and manipulate data on the connected mobile devices.

13. The method of claim 10, further comprising copying data from the interactive surface to the particular connected mobile device at least in part by placing the particular connected mobile device over the data.

14. The method of claim 10, further comprising:
placing another particular connected mobile device on the interactive surface; and
creating additional workspace for the another particular connected mobile device around the another particular connected mobile device using at least a portion of display space on the interactive surface to facilitate background monitoring via display on the interactive surface of less important programs and data of the another particular connected mobile device.

15. The method of claim 10, further comprising:
persisting the connection between the interactive surface and the particular connected mobile device in a virtual manner when the particular connected mobile device is removed to a remote location from the interactive surface; and
communicating between the interactive surface and the particular connected mobile device connected to the interactive surface in the virtual manner from the remote location.

16. The method of claim 10, further comprising projecting various displays specific to the particular mobile device onto the display of the interactive surface.

17. The method of claim 10, further comprising sharing an input device between a first mobile device and a second mobile device without requiring a pairing procedure, wherein the first mobile device has a first user and the second mobile device has a second user, the first user and the second user being different.

18. The method of claim 10, further comprising upon the particular connected mobile device having been disconnected from the interactive surface and reconnected to the interactive surface, associating the particular connected mobile device to the group of connected mobile devices.

19. A method that facilitates extending input/output capabilities of mobile devices comprising:
establishing a connection between multiple mobile devices and an interactive surface;
identifying the mobile devices;
determining a position and orientation of each mobile device on the interactive surface;
determining a spatial relationship between the mobile devices, wherein determining the spatial relationship comprises ascertaining the position and orientation of each mobile device relative to another mobile device;
grouping the mobile devices based at least on:
the spatial relationship between the mobile devices;
a unique visual pattern on each mobile device; and explicit controls located on the interactive surface; and moving and copying data between mobile devices or groups of mobile devices.

20. A computer storage memory or media device having computer-executable instructions recorded thereon, the computer-executable instructions upon execution by a processor, programming a computer to perform the method as recited in claim 19.

* * * * *